(12) United States Patent
Hirota et al.

(10) Patent No.: US 6,425,528 B2
(45) Date of Patent: Jul. 30, 2002

(54) EXPANSION VALVE

(75) Inventors: Hisatoshi Hirota; Shinji Saeki; Takashi Kobayashi, all of Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 09/788,993

(22) Filed: Feb. 19, 2001

(30) Foreign Application Priority Data

Feb. 22, 2000 (JP) ........................................ 2000-043812

(51) Int. Cl.$^7$ ................................................. F25B 41/04
(52) U.S. Cl. ........................ 236/92 B; 62/225; 137/375
(58) Field of Search ........................ 62/225; 236/92 B; 137/375

(56) References Cited

U.S. PATENT DOCUMENTS

| | | | | |
|---|---|---|---|---|
| 4,553,562 A | * | 11/1985 | Nakada | ..................... 137/375 |
| 4,979,372 A | * | 12/1990 | Tanaka | ..................... 236/92 B |
| 5,060,485 A | * | 10/1991 | Watanabe et al. | ......... 236/92 B |
| 5,127,237 A | * | 7/1992 | Sendo et al. | ............... 236/92 B |
| 6,062,484 A | * | 5/2000 | Eybergen | ................... 236/92 B |
| 6,176,265 B1 | * | 1/2001 | Takahashi et al. | .......... 137/375 |

* cited by examiner

*Primary Examiner*—William E. Tapolcai
(74) *Attorney, Agent, or Firm*—Nilles & Nilles SC (57) ABSTRACT

In an expansion valve the pressure vessel of which is constituted by a reduced number of parts and which does not require seal members a valve unit is surrounded by first and second half shells which in turn are surrounded by a pressure vessel formed as a one-piece body by molding resin by an insert molding process. Since the resin constituting the resin molded one-piece pressure vessel simultaneously form internal sealing member structures no additional seal members are required to be positioned and mounted. The first and second half shells are shaped such that the necessary refrigerant passages for the valve unit are defined in communication with connection holes of the pressure vessel.

6 Claims, 15 Drawing Sheets

PRIOR ART

EXPANSION VALVE

BACKGROUND OF THE INVENTION

The present invention relates to an expansion valve and to a method for manufacturing the expansion valve conventionally used in a refrigerating cycle of an automobile air-conditioner or the like for adiabatically expanding a high temperature, high-pressure liquid refrigerant to turn the refrigerant into a low temperature low-pressure gas liquid mixture of refrigerant and also for controlling the flow rate of the refrigerant such that the refrigerant has a predetermined degree of overheat at the outlet of an evaporator. The expansion valve according to the invention includes a in-built valve unit, said valve unit having the function of a temperature sensing section detecting the degree of refrigerant overheat at an outlet of an evaporator and the function of a valve element controlling a passing amount of high-pressure refrigerant to be adiabatically expanded in accordance with changes of the degree of refrigerant overheat as detected by said temperature sensing section.

In known refrigerant cycles of car air-conditioners the expansion valve arranged in an evaporator casing is connected to refrigerant inlet and outlet pipes of the evaporator which is arranged in the vehicle compartment. Said expansion valve is also connected to pipes leading to a compressor and a condenser, respectively, both of which are arranged in the engine compartment.

Figure 19:
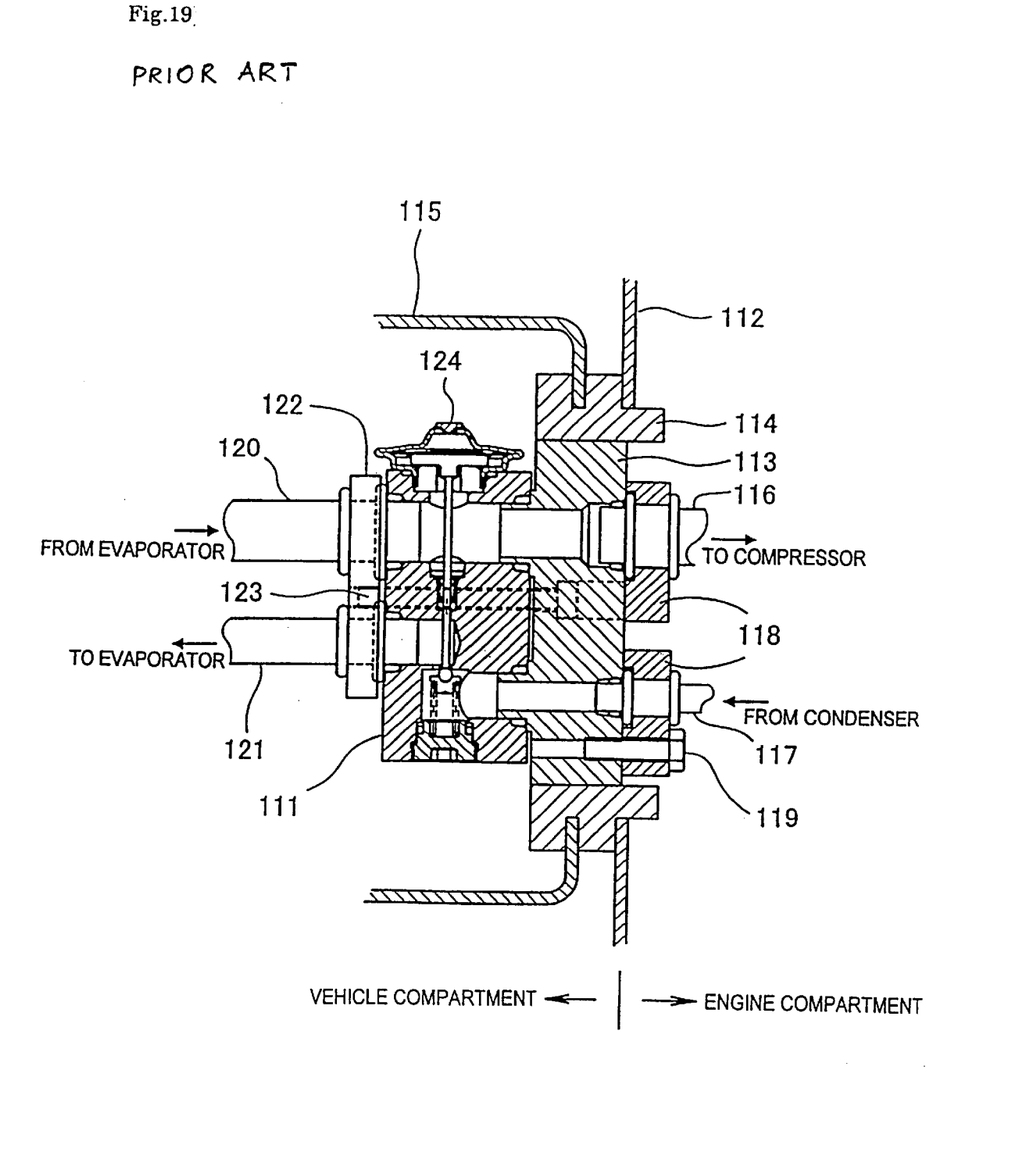

The mounting of a conventional expansion valve is illustrated in FIG. 19. The expansion valve 111 is fixed to a partition wall 112 separating the vehicle compartment from the engine compartment. Due to the irregular external shape of expansion valve 111 a connector 113 is needed as an adapter matching to the external shape of the expansion valve. Connector 113 is joined to that side of the expansion valve to which the pipes are connected leading to the compressor and the condenser. Around connector 113 an insulator 114 is provided sealing the gap between the connector 113 and the partition wall 112 and between the connector 113 and an evaporator casing 115. Pipes 116 and 117 to compressor and the condenser are connected to connector 113 and fixed thereto by a mounting bolt 119 with a plate 118 interposed therebetween. Pipes 120 and 121 leading to an evaporator are fixed to en evaporator side of the expansion valve 111 by a mounting bolt 123 with a blade plate 122 interposed therebetween. Expansion valve 111 includes a valve unit 124 comprising a temperature sensing section measuring the refrigerant temperature at the outlet of the evaporator and a valve element the degree of opening of which is determined by the refrigerant temperature at the outlet of the evaporator. In FIG. 19 valve 124 has its temperature sensing section arranged outside of the refrigerant pipe. There are other types of expansion valve units where the temperature sensing section is arranged inside the refrigerant pipe. In either type, the expansion valve unit used has a low-pressure passage for the refrigerant exiting the evaporator and a high-pressure passage with the valve element inserted therein for restricting the flow of liquid refrigerant and expanding the refrigerant prior to the refrigerant reaching the evaporator. The temperature sensing section is arranged in the low-pressure passage. The valve element is actuated in accordance with the measured temperature.

Among expansion valves having the temperature sensing section received inside its casing, there is a type known in which the valve unit (temperature sensing section and valve element integrally combined) is completely received in a pressure vessel. The pressure vessel used is formed from extruded aluminium material. A chamber or cavity is cut out for receiving the valve unit. Also the high-pressure and low-pressure passages are formed into said pressure vessel. However, seal members are needed in said pressure vessel, and a lid closing the pressure vessel after the valve unit is inserted, such that any gaps between the valve unit and the refrigerant passages and the surrounding are sealed in order to completely seal the pressure vessel. The plurality of seals needs corresponding manufacturing machining or preparation. Due to the complexity of the seals and their number the likelihood of refrigerant leaking to the outside is high.

OBJECTS AND SUMMARY OF THE INVENTION

It is an object of the present invention to create an expansion valve included into a pressure vessel which expansion valve is constituted by a reduced number of parts and does not require seal members to be inserted or manufacturing preparation for the insertion of seal members.

In the expansion valve according to the invention, the pressure vessel completely enclosing the valve unit is formed solely by resin moulding. By said moulding process it is unnecessary to use seal members such as O-rings, which normally constitute a primary cause of refrigerant leakages to the outside. Forming the pressure vessel solely by resin moulding also allows to reduce the number of parts necessary to constitute the expansion valve, because the pressure vessel is constituted by a single resin-moulded article. The expansion valve is completed for operation as soon as the pressure vessel is formed with the valve unit contained therein. Any further assembling steps can be avoided.

The valve unit is surrounded by two half shells which in turn are surrounded by a body block formed by insert moulding and defining said pressure vessel. Since the pressure vessel is formed solely by resin moulding, any further step of assembling the expansion valve can be omitted. Since neither a lid nor any O-rings are required for sealing purposes, the number of parts of the expansion valve can be reduced, thus reducing the manufacturing and assembling costs. Furthermore, no O-rings are used for sealing purposes, so that the refrigerant is prevented from leaking to the outside.

Both half shells are shaped to define therein a gap at a boundary between the high-pressure region and the low-pressure region. By injecting resin into the gap when the body block or pressure vessel is formed by insert moulding a wall sealing structure is formed by injected resin. It is, therefore, unnecessary to provide any separate seal member at the boundary between the high and low pressure regions.

The expansion valve defines by its pressure vessel an elliptic outer form and as such can serve as a connector so that no separate connector is needed when mounting the expansion valve. A flange is formed on the expansion valve adjacent to its surface to which pipes leading to the evaporator are to be mounted. Thus, satisfactory sealing performance can be ensured with ease by simply interposing an insulator between said flange and the partition separating the vehicle compartment from the engine compartment.

Metal collars are fitted in the respective holes through which the mounting bolts are inserted. In this case any stress induced by tightening the mounting bolts is taken up by the metal collars so that the pressure vessel or body block of the expansion valve made of resin is prevented from being fractured by excessively large stress applied thereto.

Particularly serial production of a large number of identical expansion valves of this type can be carried out with reduced costs. The half shells and the valve units are prefabricated components. The half shells do not need precise machining for positioning sealing members. Sub-units thus can be prefabricated by solely inserting the valve between the interconnected half shells. The sub-units can be comfortably stored and transported to the injection or insertion moulding site and can be placed one by one or in series in the respective mould cavities. By injecting the resin the pressure vessel surrounding each sub-unit and simultaneously the internal sealing member structures necessary between the regions of the expansion valve having different pressures are formed. With the termination of the insertion mould process the expansion valves are readily assembled for use. The degree of freedom to design the outer contour of the pressure vessel in view to easy and comfortable mounting of the expansion valve in an evaporator casing and at the separation wall between the engine compartment and the vehicle compartment and finally the mounting of the expansion are simplified to a considerable extent.

BRIEF DESCRIPTION OF THE DRAWINGS

Embodiments of the invention as well as a prior art expansion valve will be hereinafter described with reference to the drawings. In the drawings is.

DESCRIPTION OF THE PREFERRED EMBODIMENTS

Figure 1:
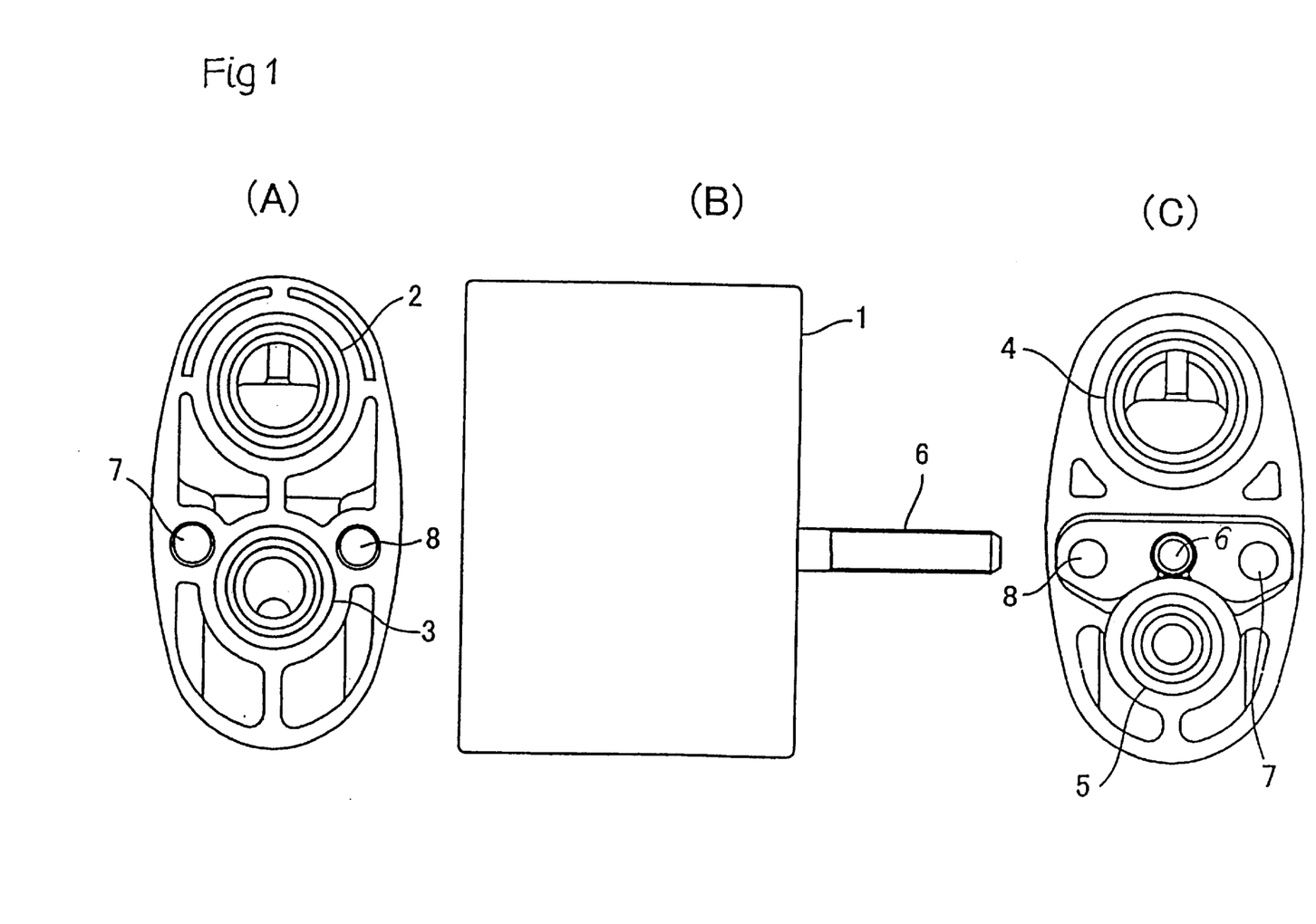
FIGS. 1A, 1B and 1C a front view, a side view and a rear of a first embodiment of an expansion valve, FIG. 2 a vertical sectional view of the expansion valve, FIG. 3 a further detailed longitudinal sectional view of the expansion valve, FIGS. 4A, 4B, 4C, 4D a first half shell of the expansion valve in a rear view, a side view, a front view and a sectional view, FIGS. 5A, 5B, 5C, 5D a second half shell of the expansion valve in a front view, a side view, a rear view and a sectional view, FIG. 6 a front view of a sub-unit constituted by first and second half shells confining a valve unit, FIG. 7 a longitudinal sectional view of the sub-unit of FIG. 6, in detail, FIG. 8 another longitudinal sectional view of the first embodiment of the expansion valve illustrating an integrated seal member structure, FIGS. 9 and 10 horizontal sectional views in sectional plane a—a and b—b in FIG. 8, FIG. 11 a vertical sectional view illustrating the first embodiment of the expansion valve in mounted condition, FIG. 12 a vertical sectional view of a second embodiment of the expansion valve, FIGS. 13A, 13B, and 13C a third embodiment of the expansion valve in a front view, a side view and a rear view, FIGS. 14A, 14B, 14C and 14D a example of a mounting bolt for the expansion valve, in a front view, a side view, a rear view and a sectional view (sectional plane a—a in FIG. 14A), FIGS. 15A, 15B, 15C and 15D another example of a mounting bolt for the expansion valve, in a front view, a side view, a rear view and a view in viewing direction b—b of FIG. 15A, FIG. 16 a horizontal sectional view of a modified expansion valve containing method collars, FIG. 17 a vertical sectional view of an expansion valve in mounted condition, FIG. 18 a vertical sectional view of another mounting structure of a flanged expansion valve, and FIG. 19 a vertical sectional view of a mounted conventional expansion valve according to prior art.

In FIGS. 1A to 1C a first embodiment of an expansion 1, as an example for an expansion valve useful for a refrigerating cycle of a car air-conditioner, has the shape of a elliptic cylinder with front and rear pipe mounting surfaces and refrigerant pipe connection holes 2, 3, 4 and 5. Hole 2 is an opening to which a refrigerant pipe extending from the outlet of a not shown evaporator is connected. To hole 3 a refrigerant pipe extending to the inlet of said evaporator is to be connected. To hole 4 a refrigerant pipe extending to a not shown compressor is to be connected. To hole 5 a refrigerant pipe extending from a not shown condenser is to be connected.

Figure 2:
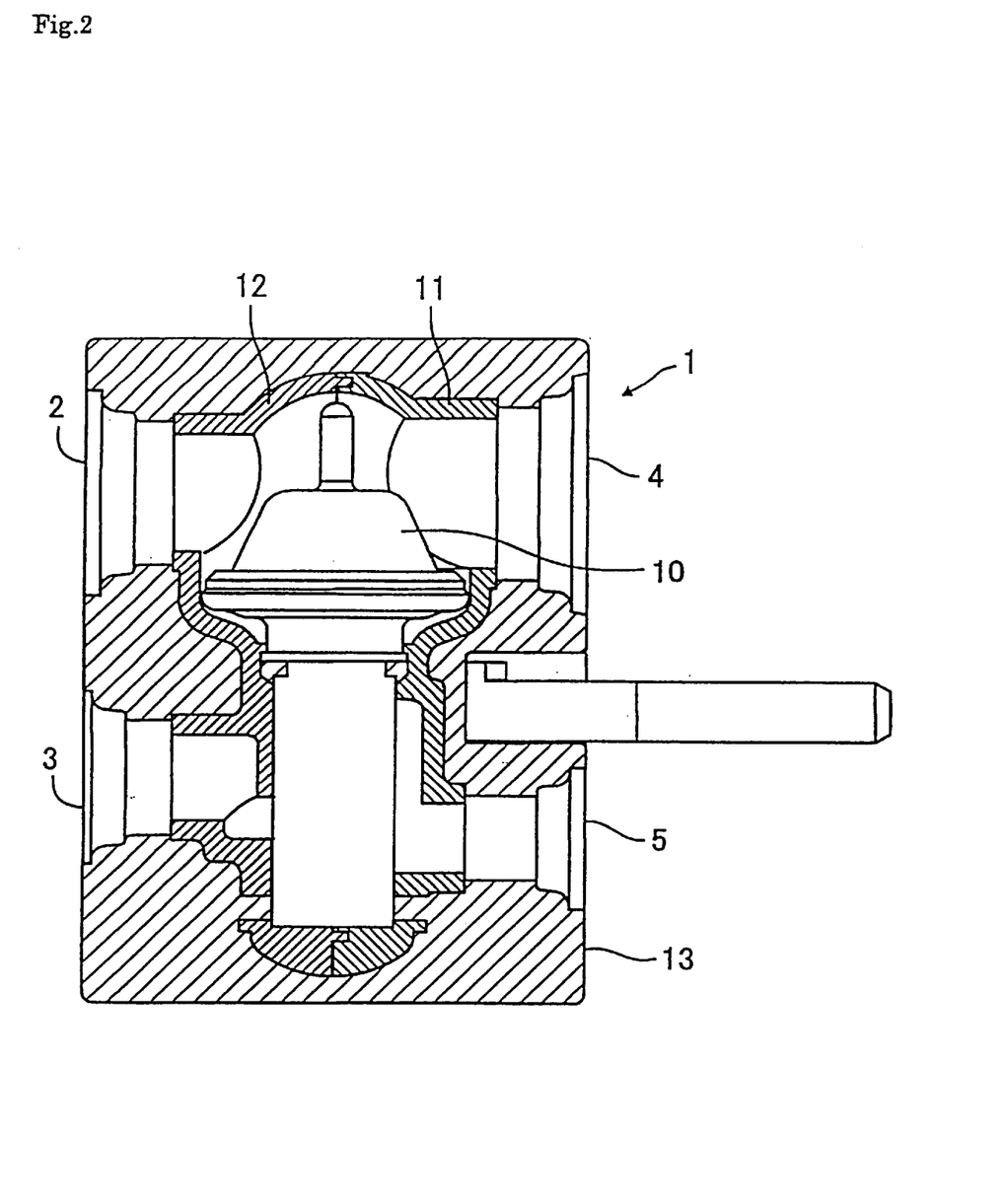

Refrigerant pipes connected to holes 4 and 5 can be fixed by means of an embedded bolt 6. Holes 7 and 8 permit to insert bolts, not shown, provided on the evaporator side, to secure the expansion valve 1 in position. The compressor and the condenser of the refrigerating cycle are arranged in the engine compartment, while the evaporator is arranged in the vehicle compartment. Expansion valve 1 is intended to be arranged at a partition wall separating the engine compartment from the vehicle compartment. In FIG. 2 a valve unit 10 is arranged in a central portion of the expansion valve 1. Valve unit 10 is surrounded by first and second half shells 11, 12 which, in turn, are surrounded by a body block or pressure vessel 13.

Valve unit 10 has a temperature sensing section and a valve member integrally combined with each other. The first and second half shells 11, 12 have the function to define refrigerant passages between the valve unit 10 and the pressure vessel 13 in communication with refrigerant pipe connection holes 2, 3, 4 and 5 provided in said pressure vessel. Said pressure vessel or body block 13 forming the outermost part of said expansion valve 1 is formed by moulding a resin into a one-piece body by insert moulding.

Figure 3:
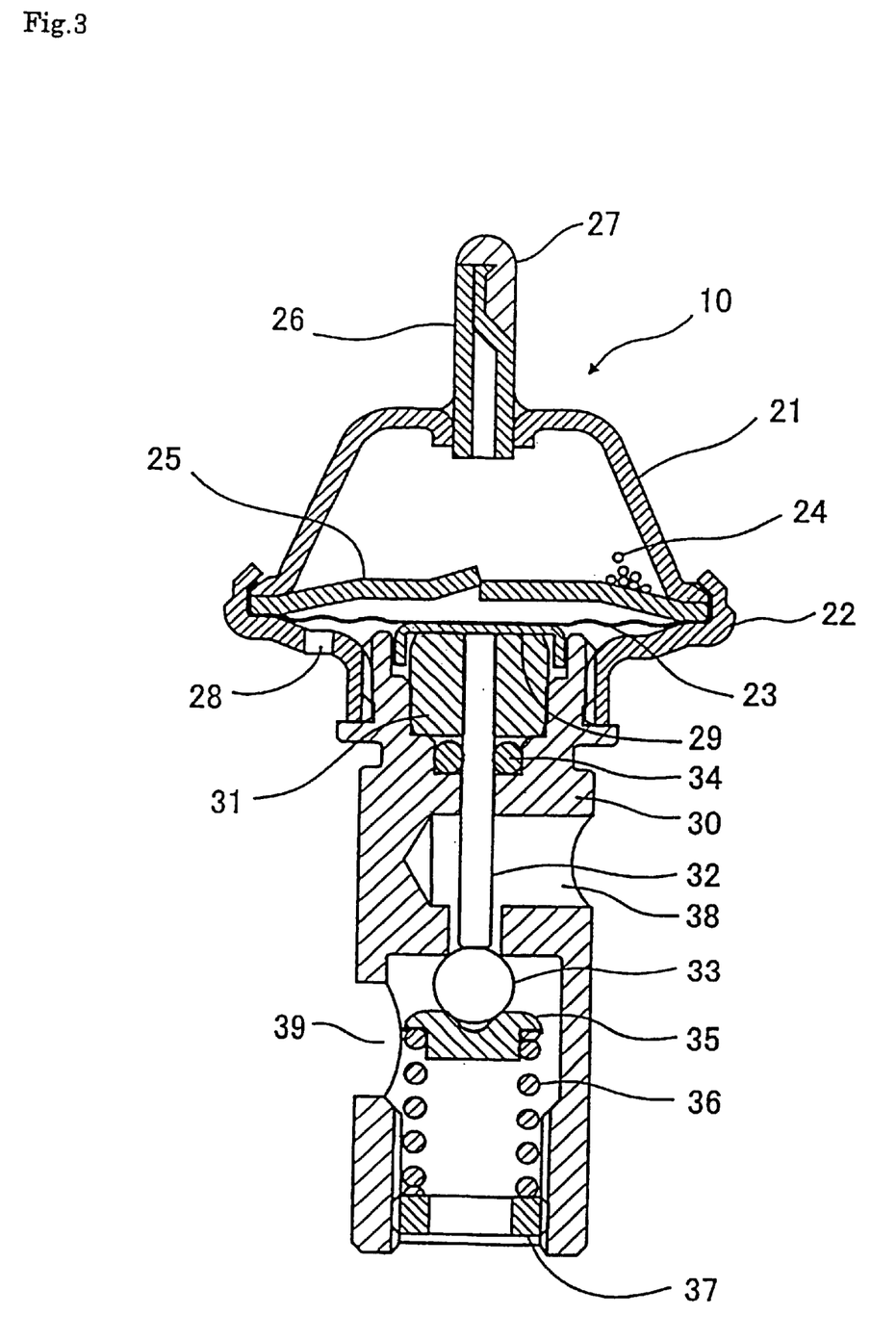

In FIG. 3 a diaphragm 23 is arranged in valve unit 10 a space surrounded by upper and lower housing parts 21, 22. A retainer 25 is provided above diaphragm 23 for retaining activated charcoal 24 adjusting the response speed of the temperature sensing section. A capillary tube 26 protrudes from the upper housing 21 used to fill gas into upper housing part 21. After filling the gas tube 26 is crushed flat and is cut and it brazed using a brazing filler metal 27 to prevent leakage of the gas. In lower housing part 22 a pressure equalising hole 28 is cut leaving space beneath diaphragm 23 open.

Below diaphragm 23 a disk 29 and below disk 29 a stopper 31 are provided. Stopper 31 is slidably received in a cylinder chamber formed in an upper portion of valve body 30 for controlling and regulating the stroke of the diaphragm 23. A shaft 32 transmits displacement of the diaphragm 23 to a valve ball 33. O-ring 34 prevents high-pressure refrigerant acting upon valve ball 33 from leaking to the low-pressure, equalised pressure region.

Shaft 32 and valve ball 33 are welded together. Valve ball 33 is urged in closing direction towards a valve seat by a spring 36 and via a valve holder 35. Spring 36 is seated against an adjusting screw 37 allowing to adjust the force of spring 36. By spring 36 a set value for the static overheat degree of the expansion valve can be adjusted.

Valve body 30 has a high-pressure refrigerant inlet port 38 at an upstream side of valve ball 33, and a low-pressure refrigerant outlet port 39 downstream of valve ball 33.

When upper housing part 21 is exposed to the refrigerant at the outlet of the evaporator, the refrigerant temperature is converted into a pressure depending on the adsorptivity of activated charcoal provided. As said pressure changes valve body 33 is displaced by the diaphragm 23, disk 29 and shaft 32. In this way the opening degree of said valve ball in relation to its associated valve seat is controlled.

Figure 4:
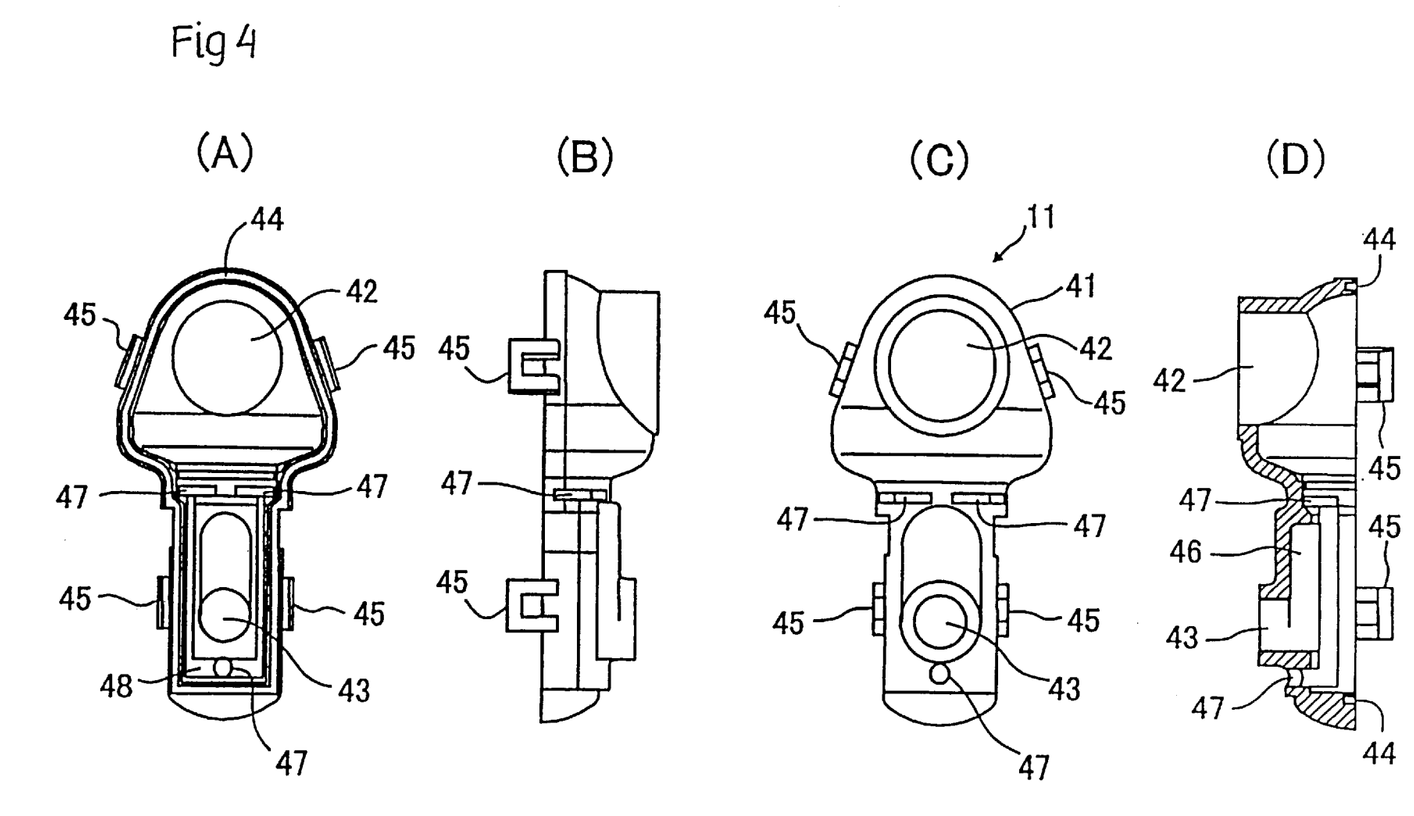
Figure 5:
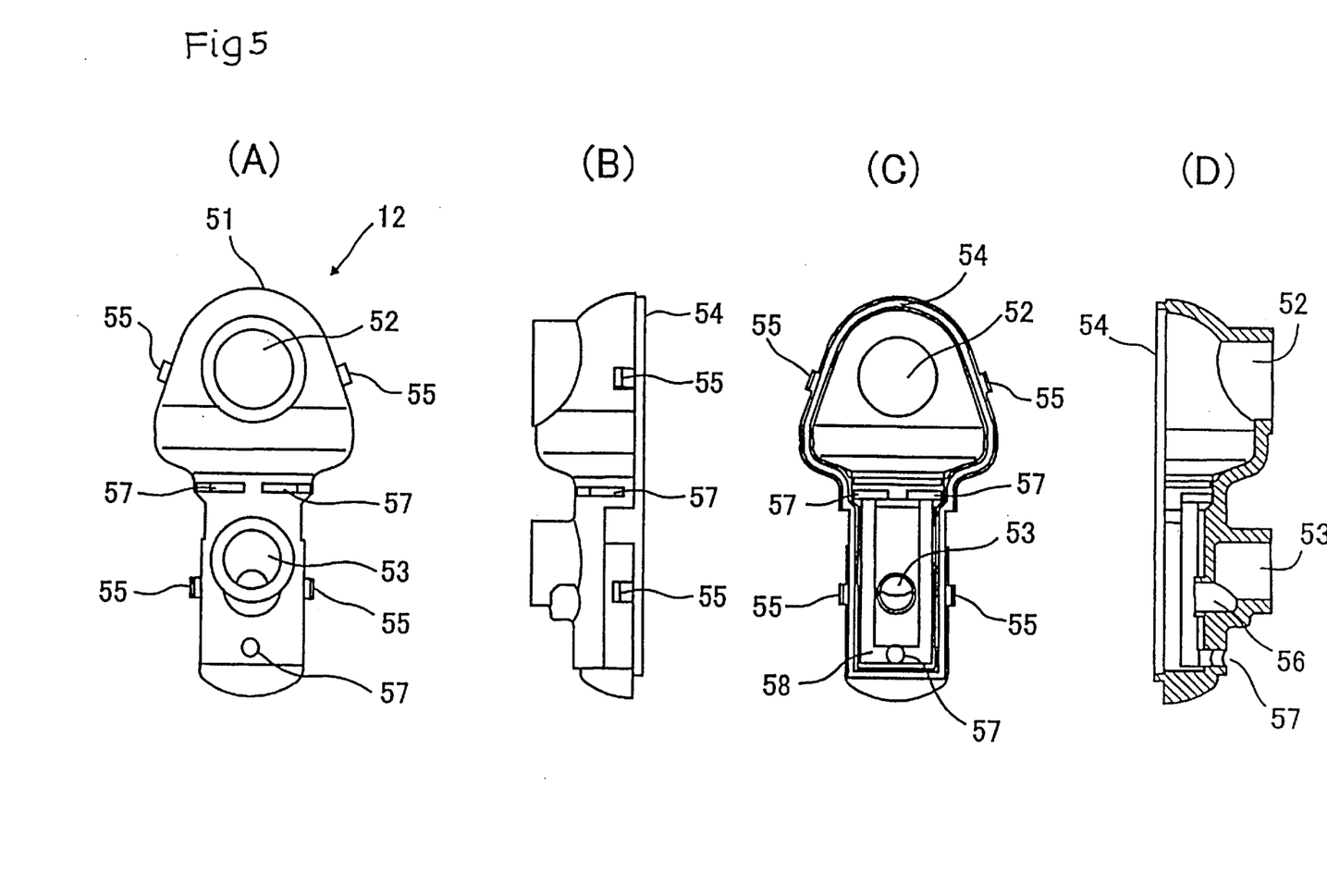
Figure 6:
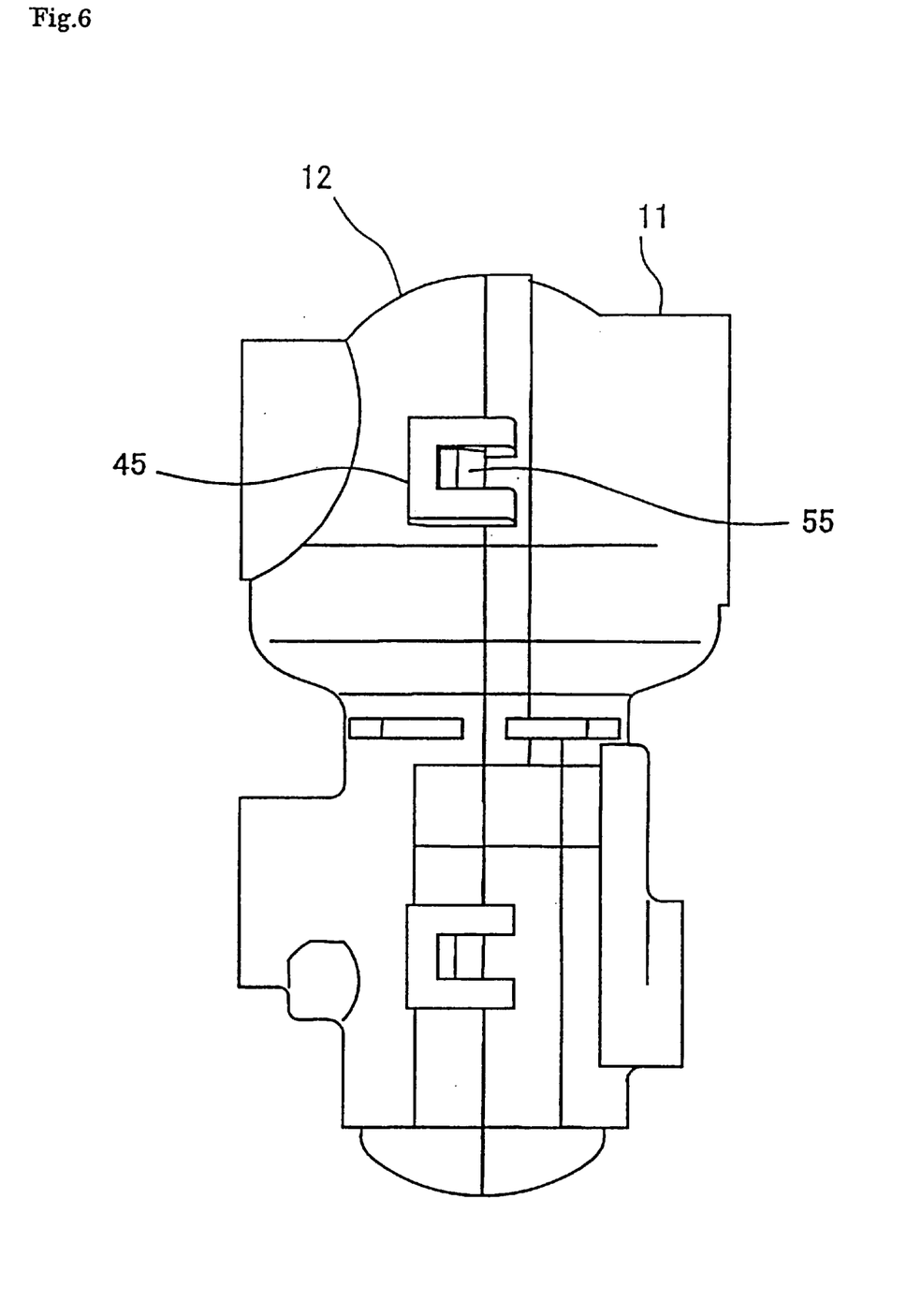

The valve unit 10 surrounded by said first and second half shells 11 and 12 (FIGS. 4 and 5) forms a sub-unit as shown in FIG. 6. A body 41 of the first half shell 11 in FIGS. 4A to 4D has a hole 42 defining an opening for communication with refrigerant pipe connection hole 4 of pressure vessel 13, and a hole 43 defining an opening for communication with refrigerant pipe connection hole 5. In an end face of body 41 along the outer circumference or continuous edge region an engaging groove 44 is cut fitting to an engaging rib 54 of the other second half shell of FIG. 5A to FIG. 5D. This is the edge region in which the first half shell 11 is to be joined to the second half shell 12. At the periphery of body 41 hooks 45 are formed serving to securely join the second half shell 12 to the first half shell 11.

Inside body 41 a refrigerant passage 46 is formed for guiding refrigerant from hole 43 to high-pressure refrigerant inlet port 38 of valve unit 10. Into body 41 resin injection holes 47 are cut so as to open from the outside into a seal-forming groove 48 formed inside body 41. Resin injection holes 47 and seal-forming groove 48 are used to form a seal member structure integrally with pressure vessel or body block 13 when said pressure vessel 13 is formed from resin by an insert moulding process. During said process resin is injected through said resin injection holes 47 into the space defined between the seal-forming groove 48 and valve unit 10 resulting in the integral seal member structure.

A body 51 of the second half shell 12 in FIGS. 5A to 5D has holes 52, 53 defining openings for communication with refrigerant pipe connection holes 2 and 3. On an end face of body 51 along the outer circumference or edge region an engaging ridge 45 is formed fitting into groove 44 of first half shell 11. Said engaging ridge 54 extends along the edge region of said second half shell 12 along which both half shells 11, 12 are to be joined to each other. At the outer periphery of body 51 engaging portions 55 are formed in alignment with hooks 45 of the first half shell 11. When joining both half shells 11, 12 engaging portions 55 are brought into engagement with hooks 45 for a positive joint of both half shells.

Inside body 51 of second half shell 12 a refrigerant passage 56 is formed for guiding refrigerant from low-pressure refrigerant pressure outlet port 39 of valve unit 10 to hole 53. Resin injection holes 53 are cut into body 51 so as to open from outside into a seal forming groove 58 formed inside body 51. Also through resin injection holes 57 resin is to be injected into the space defined between the seal forming groove 58 and the valve unit 10 to form a seal member structure integrally with pressure vessel or body block 13 at the same time when pressure vessel 13 is formed from resin by insert moulding.

FIG. 6 illustrates the sub-unit in which valve unit 10 is surrounded by the interconnected first and second half shells prior to moulding the pressure vessel. Portion 55 are engaging with hooks 45. In the sectional view of FIG. 7 the engaging ridge 54 of the second half shell 12 is fitted into engaging groove 44 of the first half shell 11 to assemble the valve unit 10 and both shells 11, 12 in said sub-unit. In said sub-unit port 38 of valve unit 10 is aligned with refrigerant passage 46 of first half shell 11 and also with outlet port 39 of valve unit 10 aligned with refrigerant passage 56 of the second half shell 12. The assembling of said sub-unit is completed as soon as engaging portions 55 of the second half shell are brought into engagement with hooks 45 of first half shell 11.

Figure 7:
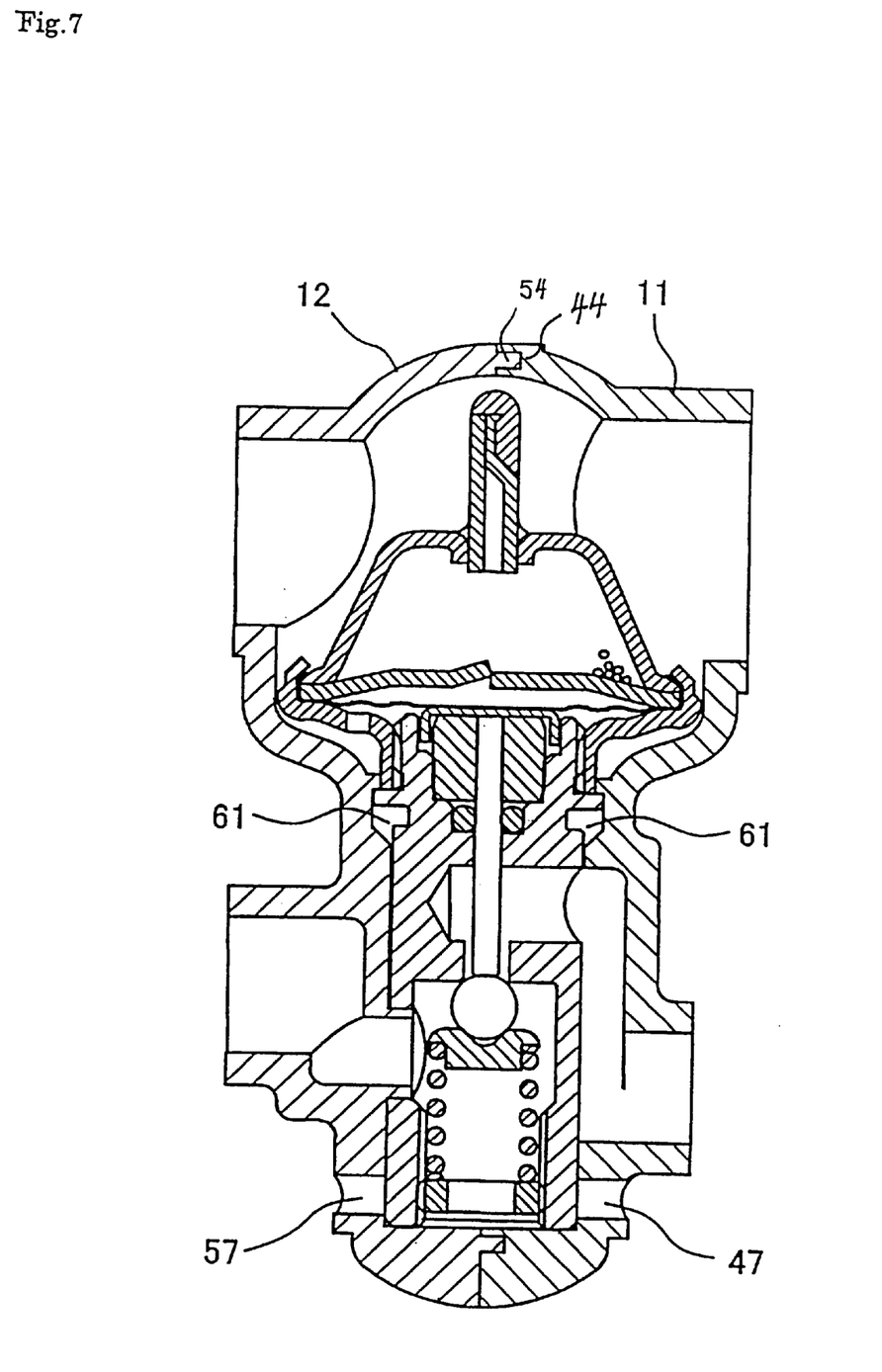

At this stage of the manufacturing of the expansion valve, in FIG. 7, seal-forming passages 61 are defined by portions of the surface of valve unit 10 near inlet port 38 and outlet port 39 and by said seal-forming grooves 48 an 58 inside first and second half shells 11, 12. Said seal-forming passages 61 communicate with each other inside the half shells and open to the outside through said resin injection holes 47, 57 of both half shells 11, 12.

The assembled sub-unit thus obtained is positioned in a form cavity in an injection moulding machine. Then said body block or pressure vessel 13 is formed by insert moulding from resin. During insert moulding said pressure vessel 13 is formed from resin around the first and second half shells 11, 12. At the same time the seal-forming passages 61 are filled with resin injected through resin injection holes 47, 57, so that a seal member structure and the body block or pressure vessel 13 are formed as a one-piece body.

Figure 8:
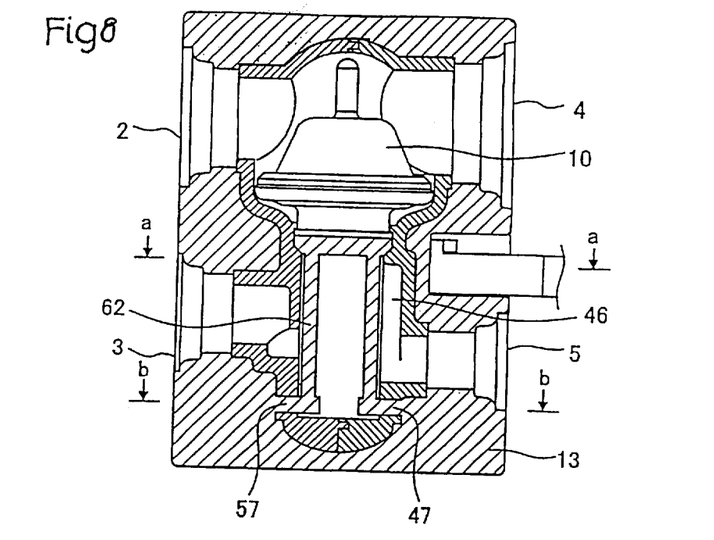
Figure 9:
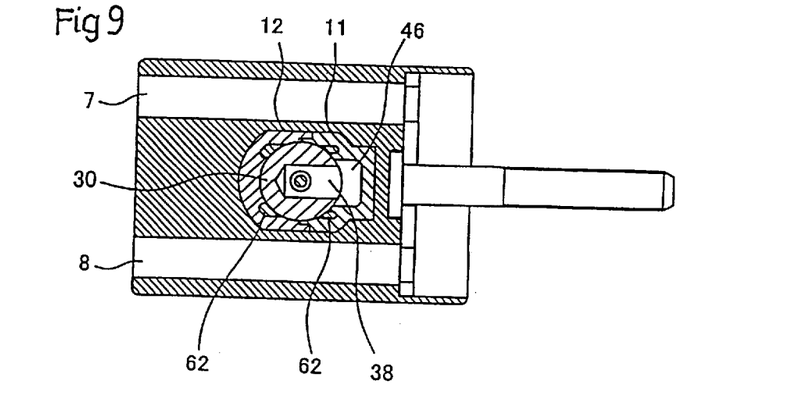
Figure 10:
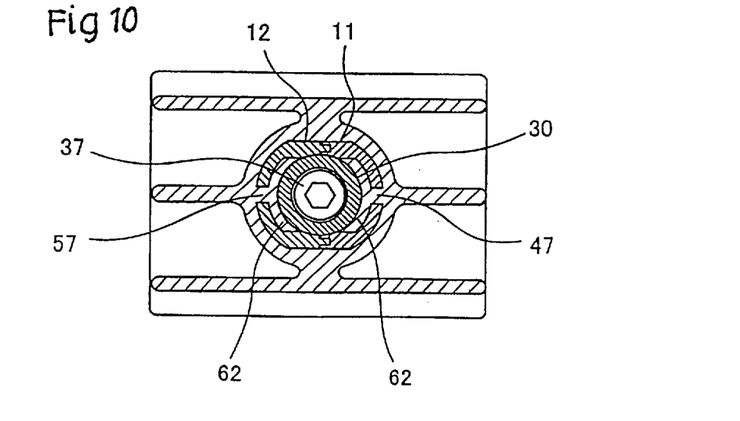

In FIGS. 8, 9 and 10 resin injected through resin injection holes 47, 57 of both shells 11, 12 flows along the outer surface of valve body 30 and surrounds the outer peripheral surface of same, except inlet port 38 and outlet port 39 of valve unit. Seal forming passages 61 then are consequently filled by the injected resin thus forming a seal member structure 62. Said seal member structure 62 serves to seal in a boundary between a high-pressure region close to connection hole 5 and low-pressure region close to connection hole 3. Seal member structure 62 further seals at a boundary at which the refrigerant passage connecting connection holes 2, 4 is bounded by the high-pressure region close to connection hole 5 and the low-pressure region close to connection hole 3. As seal member structure 62 and body block or pressure vessel 13 are formed as a one-piece body, no seal members such as O-rings are needed as in conventional arrangements.

Figure 11:
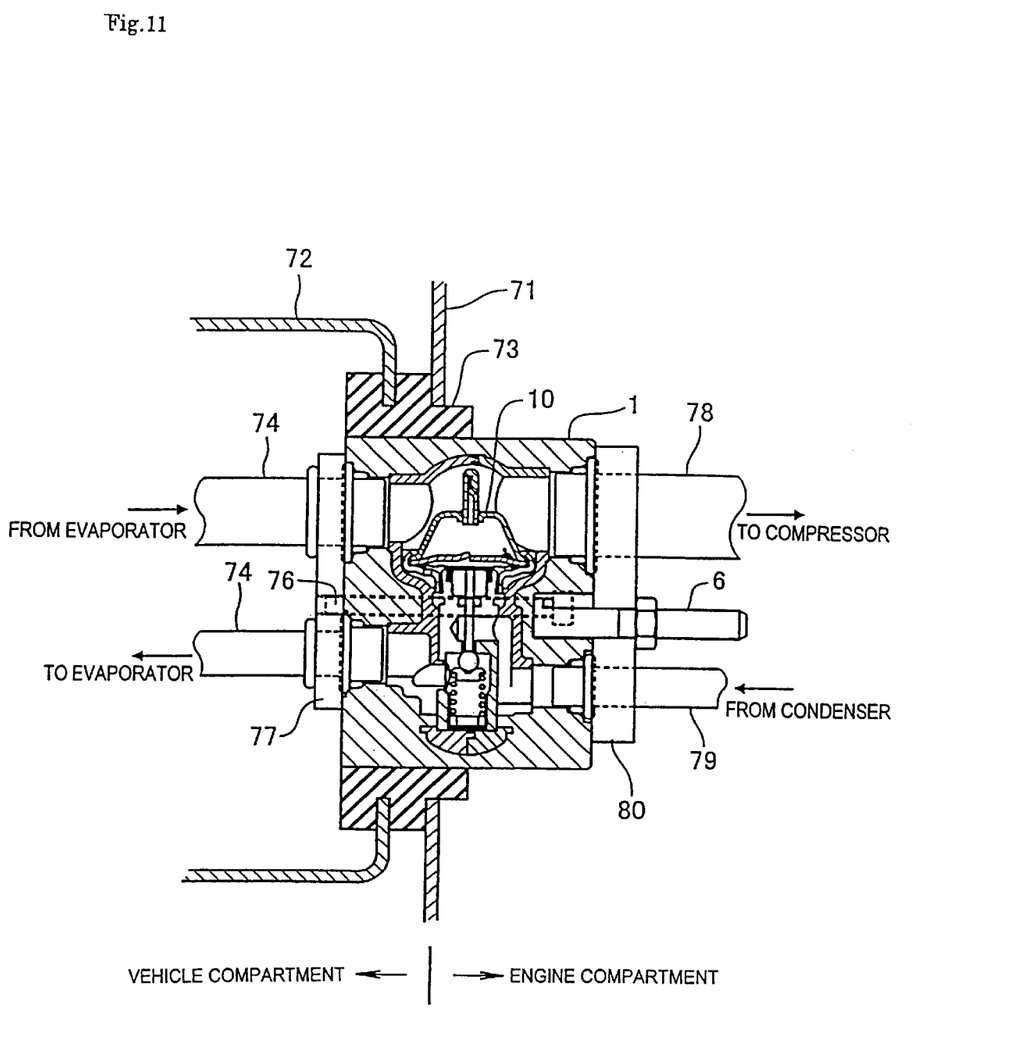

In FIG. 11 expansion valve 1 is fitted through an elliptic hole cut in a partition wall 71 separating the vehicle compartment from the engine compartment in a car. An insulator 73 winds around expansion valve 1 to seal a gap between the outer contour of expansion valve 1 and the hole in partition wall 71 as well between partition walls 71, an evaporator casing 72 and said expansion valve 1. Said insulator 73 interrupts communication between the vehicle compartment and the engine compartment. Furthermore, the portion of the expansion valve 1 at which the valve is mounted to the evaporator casing 72 is sealed. Due to the elliptic outer form of expansion valve 1 it is unnecessary to use a connector as necessary for conventional expansion valves.

Pipes 74, 75 leading to the evaporator are connected to connection holes 2, 3, respectively, and fixed to the expansion valve 1 by mounting bolts 76 inserted from the engine compartment side through holes 7, 8 additionally, a plate 77 is used for the fixation. Pipes 78, 79 leading to the compressor and the condenser, respectively, are connected to connection holes 4, 5 and are fixed to the expansion valve 1 by embedded bolt 6 and a plate 80.

Figure 12:
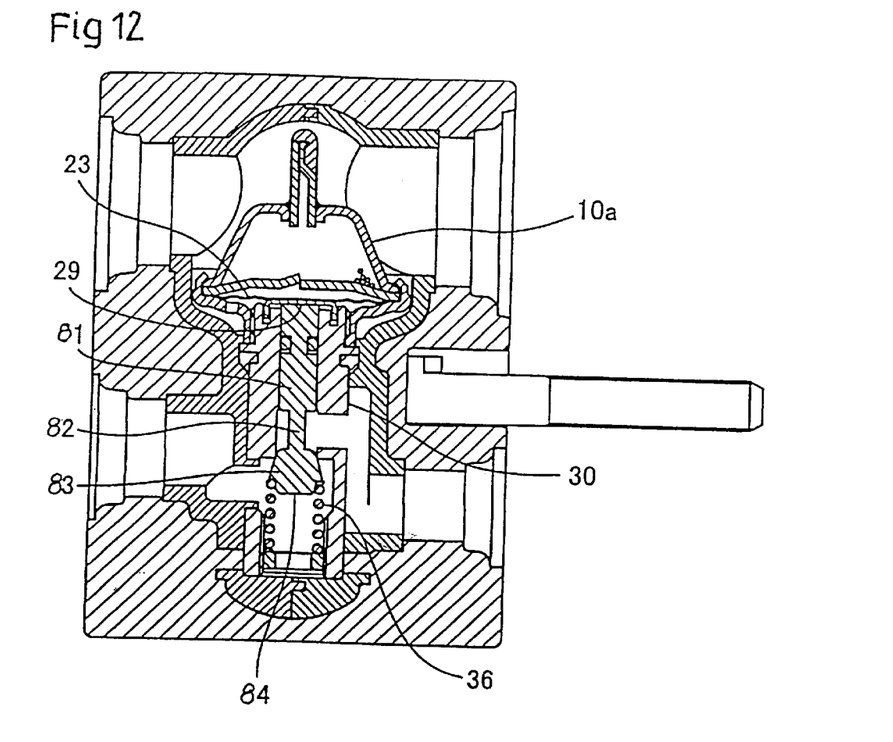

For the second embodiment of the expansion valve according to the present invention in FIG. 12 identical reference numerals are used to denote elements identical to those of the expansion valve of the first embodiment. Different from the first embodiment the valve unit 10a in FIG. 12 includes a valve poppet 83 instead of a valve ball. Valve unit 10a includes a piston 81 movably received in the cylinder of valve body 30 for reciprocating motion, a shaft 82, valve poppet body 83 and a spring seat 84 unified in a one-piece body. The upper end of piston 81 is fixed to disk 29. Spring seat 84 bears the load of spring 36. Disk 29 also functions as a stopper and regulates the stroke of diaphragm 23.

Figure 13:
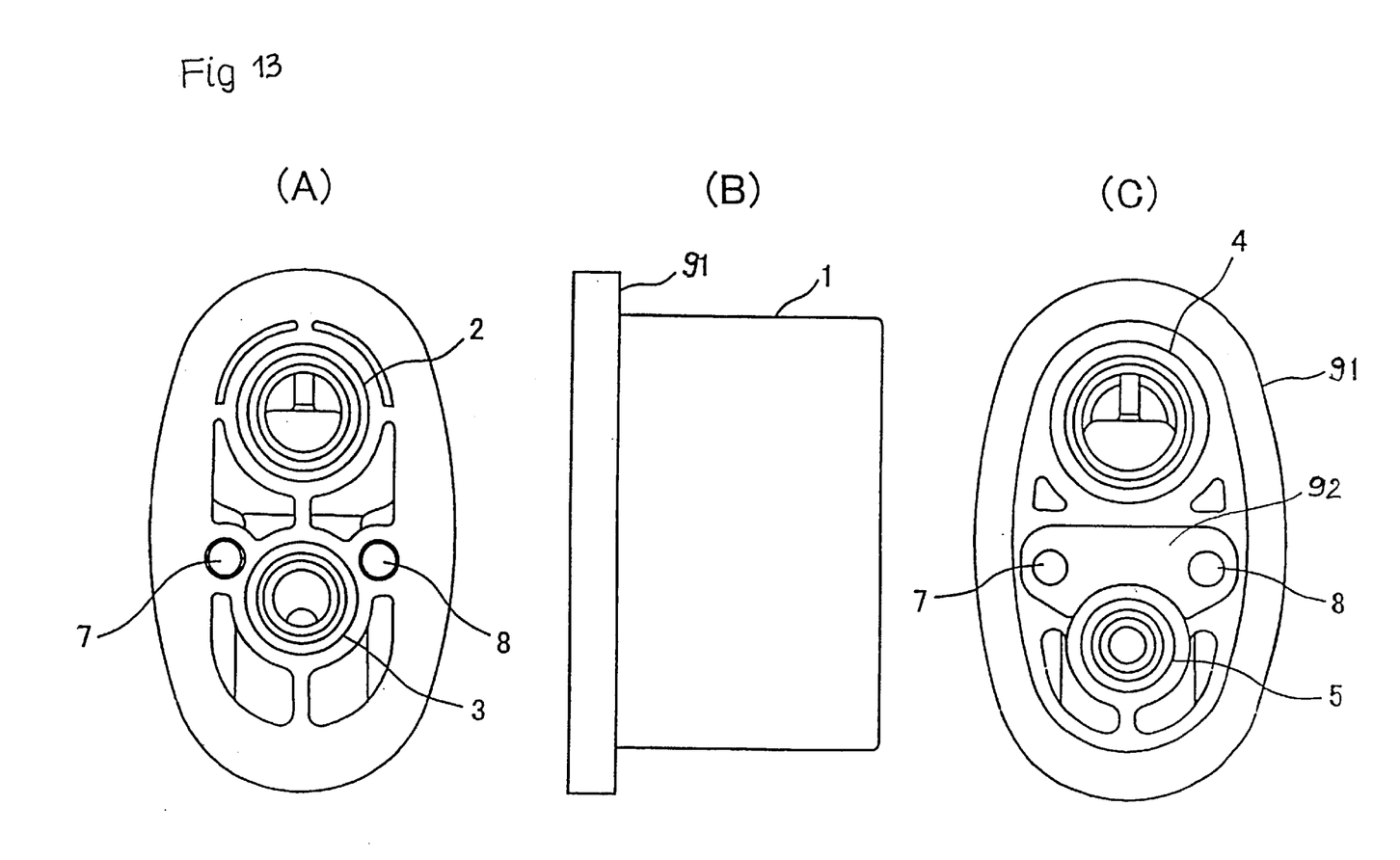
Figure 14:
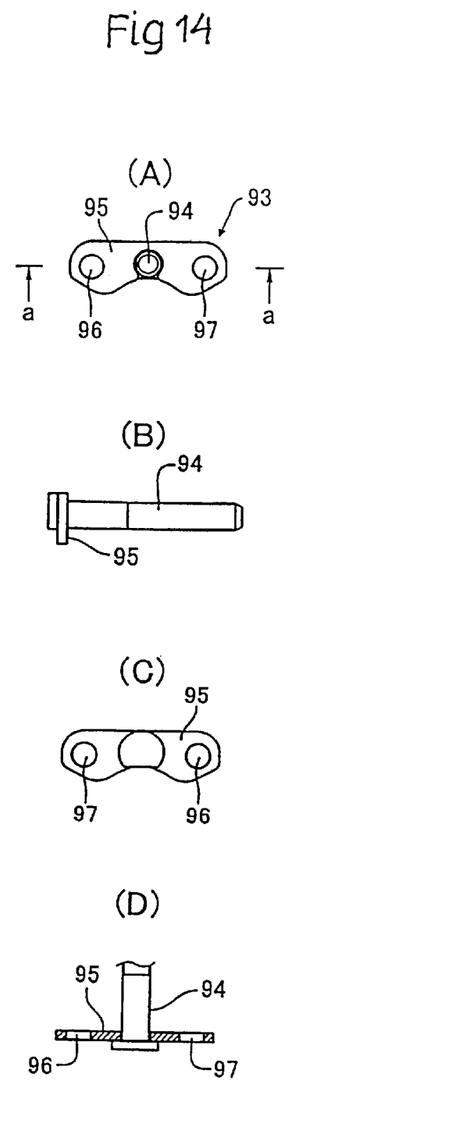
Figure 15:
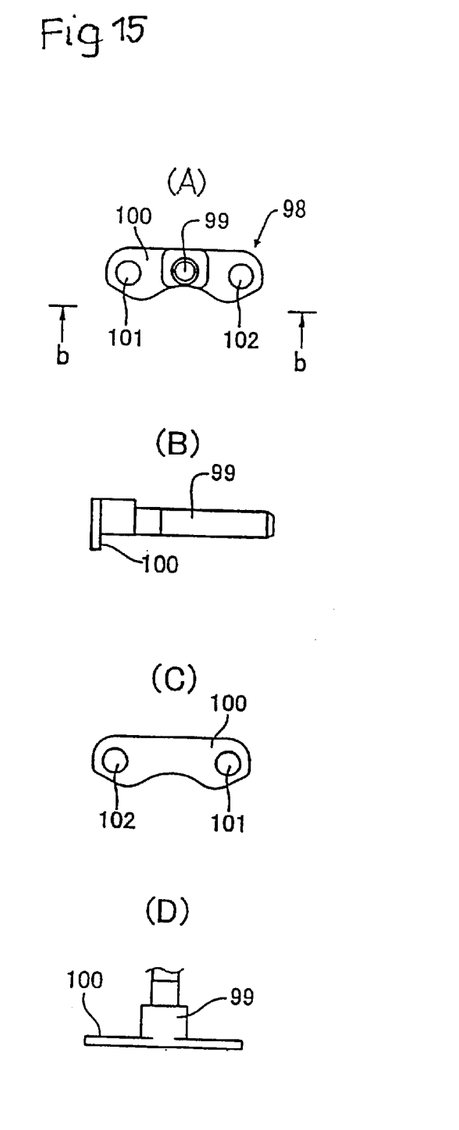

FIGS. 13A to 13C illustrate the external appearance of a third embodiment of an expansion valve 1 according to the invention. Identical reference numerals are used to denote elements identical with those of the first embodiment of FIG. 1. Flush with the end face in which connection holes 2, 3 are formed a flanged 91 is formed on the expansion valve 1. The flange 91 is formed integrally with the body block or pressure vessel when the body block is formed using resin and by an insert moulding process. In the other end face of expansion valve 1 where pipe connection holes 4, 5 are formed a recess 92 for receiving a separate mounting bolt 93 or 98 is formed.

FIGS. 14A to 14D illustrate said mounting bolt 93 comprising a bolt 94 and a plate 95 joined together by welding. Plate 95 has holes 96, 97 at locations corresponding to holes 7, 8, respectively, of the expansion valve 1. Mounting bolt 93 is attached to recess 92 when the pipes are to be connected to the expansion valve 1.

FIGS. 15A to 15D illustrate said other mounting bolt 98 comprising a plate 100 and a bolt 99 formed as a one-piece body. Plate 100 has holes 101, 102 at locations corresponding to the respective holes 7, 8 in the expansion valve 1. Mounting bolt 98 is attached in recess 92 and is used when the pipes are to be connected to the expansion valve 1.

Holes 7, 8 of expansion valve 1 are fitted with pipe mounting bolts. Those mounting bolts, when inserted, are tightened to securely fix the pipes. As soon as said mounting bolts are tightened there tightening forces are applied directly to pressure vessel 13. Since pressure vessel 13 is made of resin there is a possibility that the pressure vessel will fracture when applied with excessively large stress. According to FIG. 16 a structure is employed for preventing such fracture.

Figure 16:
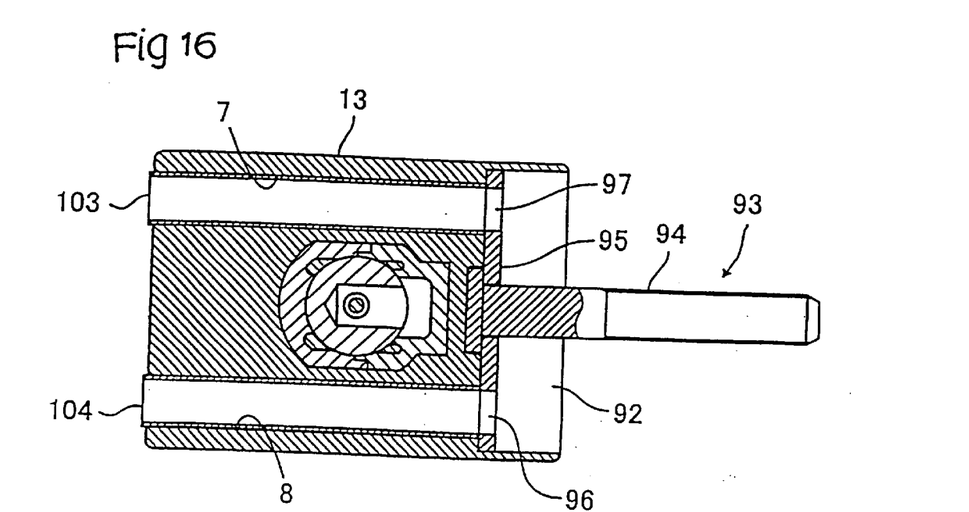

In FIG. 16 the expansion valve 1 is shown in a section along a plane passing through holes 7, 8. In holes 7, 8 metal collars 103, 104 are fitted. Collars 103, 104 are of a length slightly greater than the length of holes 7, 8. As soon as the pipes are mounted at the evaporator side with the mounting bolts inserted into holes 7, 8, the pipe fixing plate abuts against the evaporator side end faces of metal collars 103, 104, while plate 95 of mounting bolt 93 abuts against the opposite end faces of said collars, so that the plates attached to the opposite end faces of the expansion valve 1 do not directly contact portions of the resin body block or pressure vessel 13 where mounting bolts are tightened. Any stress induced by the tightening of said mounting bolts is borne by the metal collars 103, 104 to prevent the application of excessive stress to the pressure vessel 13 made of resin eliminating the danger of fractures of expansion valve 1 at the time of mounting the pipes.

Figure 17:
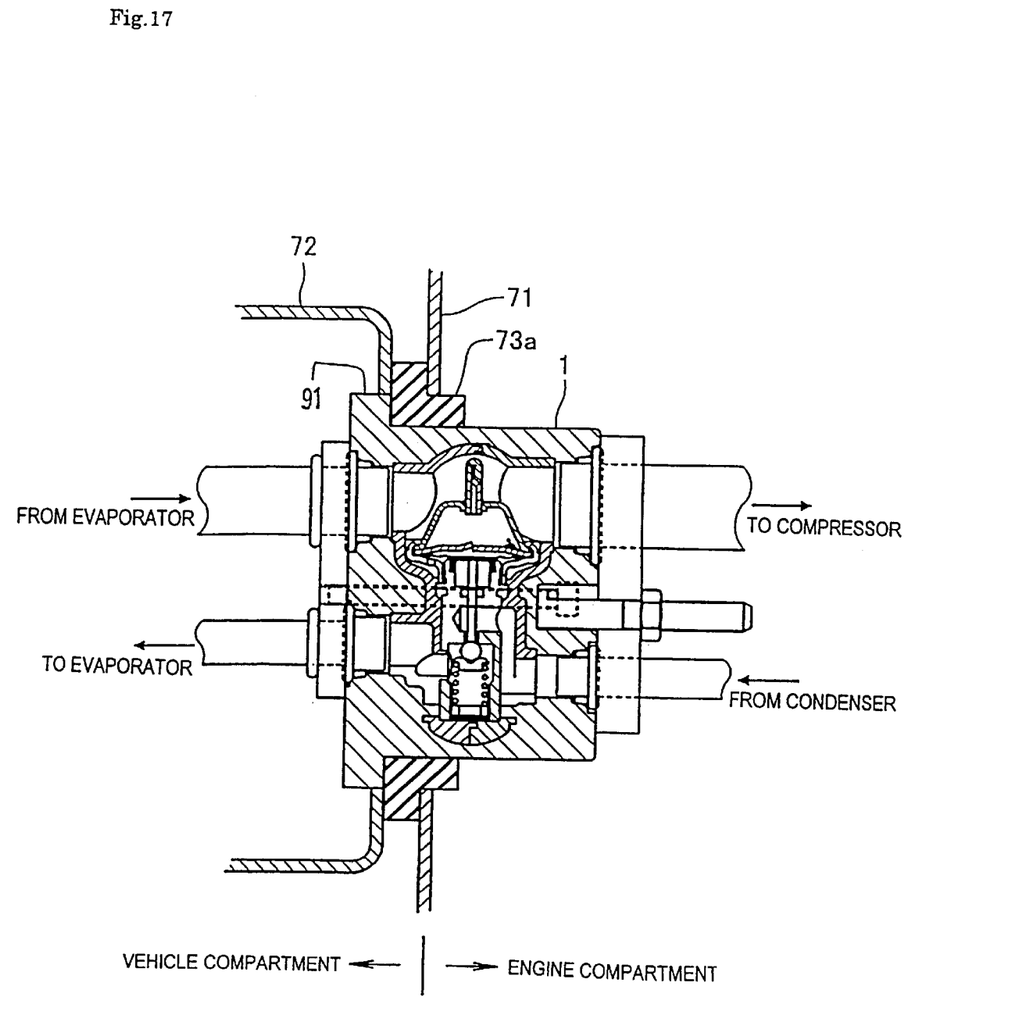

In FIG. 17 identical reference numerals are used to denote identical elements as appearing in FIG. 11. An insulator 73a having an L-shaped cross-section is fitted around expansion valve 1 and is interposed between the elliptic opening of the partition wall 71 and the outer peripheral surface of expansion valve 1 and in close contact with flange 91 and evaporator casing 72. Consequently, the gap between partition wall 72 and expansion valve 1 is sealed, blocking air communication between the vehicle compartment and the engine compartment. Simultaneously the gap between partition wall 71 and evaporator casing 72 is sealed. By thus forming the flange 91 with the shown configuration and its shown location on the expansion valve 1 it is possible to provide with ease a sealing structure for the partition wall 71 separating the vehicle compartment from the engine compartment.

Figure 18:
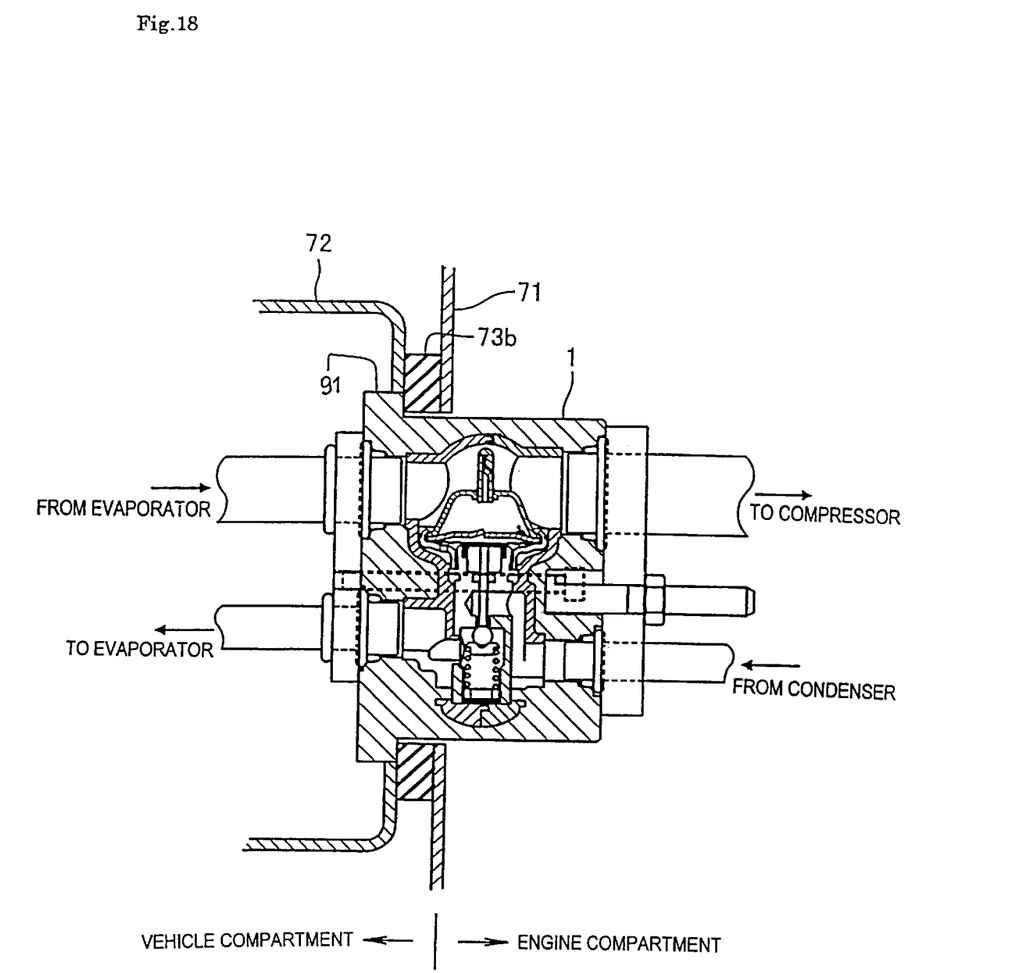

In FIG. 18 identical reference numerals are used to denote elements identical with those appearing in FIG. 11. In FIG. 18 those end faces of flange 91 and evaporator casing 72 facing partition wall 71 are positioned flush with each other. Between said end faces and partition 71 a ring-shaped insulator 73b is simply interposed to provide the necessary sealing. The insulator 73b as used is simple in shape. Also the sealing structure for the partition wall 71 separating the vehicle compartment from the engine compartment can be simplified.

What is claimed is:

1. An expansion valve including an in-built valve unit, said valve unit having the function of a temperature sensing section detecting a degree of refrigerant overheat at an outlet of an evaporator and the function of a valve element controlling a passing amount of high-pressure refrigerant to be adiabatically expanded in accordance with changes of the degree of refrigerant overheat as detected by said temperature sensing section, wherein said valve unit completely is received in an outer pressure vessel formed by moulding resin into a one-piece body by an insert moulding process, and wherein two half shells are interposed between said valve unit and said resin-moulded pressure vessel as a pre-assembled sub-unit containing said valve unit, each of said half shells having a shape forming refrigerant passages communicating with refrigerant passage ports formed by said resin-moulded pressure vessel.

2. The expansion valve as in claim 1, wherein each of said half shells has at least one resin injection port and a groove communicating with said resin injection port and extending along a boundary between an inlet section for introducing the high-pressure refrigerant and an outlet section for letting out adiabatically expanded low-pressure refrigerant, and extending along a boundary at which a refrigerant passage for passing the refrigerant from the outlet of the evaporator is bounded by the high-pressure refrigerant inlet section and by the low-pressure refrigerant outlet section, the resin forming said pressure vessel being injected into said grooves during the insert moulding process to form an integrated seal member structure of said expansion valve.

3. The expansion valve as in claim 1, wherein said resin-moulded pressure vessel has an elliptic outer form in view onto a pipe mounting surface thereof.

4. The expansion valve as in claim 1, wherein both of said half shells of said sub-unit are positively interconnected in predetermined mutually related positions along common peripheral continuous edge regions comprising a positively engaging groove and rib structure and by positively inter-engaging hook and counter hook structures provided outside of said edge regions.

5. A method for manufacturing an expansion valve for a refrigeration cycle, according to which method a valve unit including a temperature sensing section and valve element is completely inserted into a pressure vessel having a cavity for said valve unit and high-pressure and low-pressure refrigerant passages, wherein said pressure vessel is formed in one piece around said valve unit from a resin and by an insert moulding process, and wherein two half shells are interposed between said valve unit and said resin-moulded pressure vessel as a pre-assembled sub-unit containing said valve unit, each of said half shells having a shape forming refrigerant passages communicating with refrigerant passage ports formed by said resin-moulded pressure vessel.

6. Method as in claim 5, wherein said insert moulding process simultaneously and in situ forms from said resin defining said pressure vessel a sealing structure for and between the respective refrigerant passages.

* * * * *